COMPRESSOR UNIT WITH SELF-CONTAINED DRIVE MEANS
Original Filed Nov. 13, 1968 3 Sheets-Sheet 1
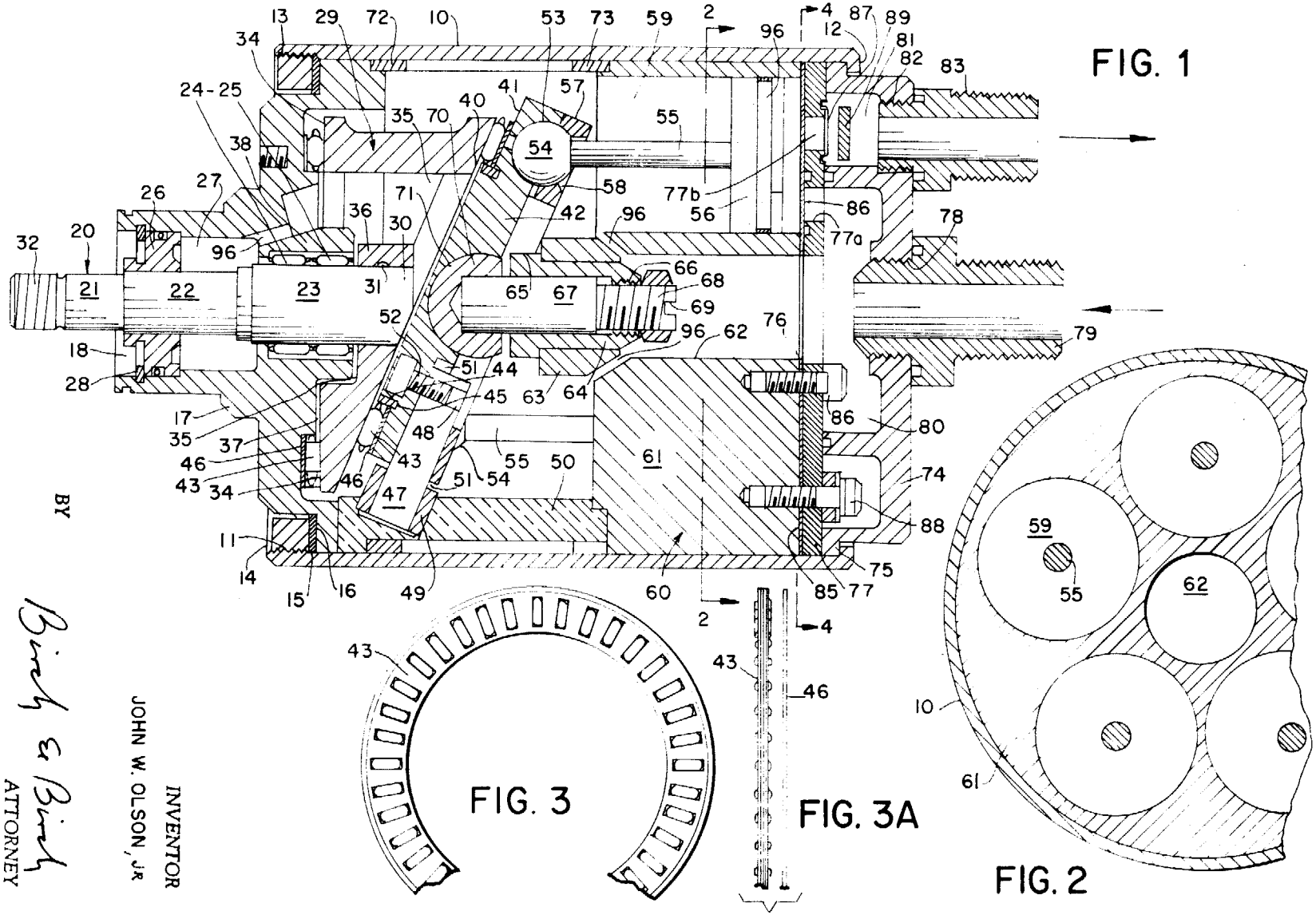
INVENTOR
JOHN W. OLSON, JR
BY Birch & Birch
ATTORNEY

COMPRESSOR UNIT WITH SELF-CONTAINED DRIVE MEANS

Original Filed Nov. 13, 1968 3 Sheets-Sheet 2

INVENTOR
JOHN W. OLSON, JR

BY

Birch & Birch
ATTORNEY

COMPRESSOR UNIT WITH SELF-CONTAINED DRIVE MEANS

Original Filed Nov. 13, 1968 3 Sheets-Sheet 3

INVENTOR
JOHN W. OLSON, JR

BY Birch & Birch
ATTORNEY

United States Patent Office

Re. 27,844
Reissued Dec. 18, 1973

27,844
COMPRESSOR UNIT WITH SELF-CONTAINED DRIVE MEANS

John W. Olson, Jr., Oklahoma City, Okla., assignor to John E. Mitchell Company, Dallas, Tex.

Original No. 3,552,886, dated Jan. 5, 1971, Ser. No. 775,334, Nov. 13, 1968. Application for reissue Sept. 18, 1972, Ser. No. 290,004
Int. Cl. F04b *1/14*
U.S. Cl. 417—269 7 Claims

Matter enclosed in heavy brackets [ ] appears in the original patent but forms no part of this reissue specification; matter printed in italics indicates the additions made by reissue.

ABSTRACT OF THE DISCLOSURE

A multiple piston compressor unit and drive means therefor for use in mobilized air conditioning systems such as used with automotive vehicles characterized by compact size, smooth performance, economy, minimum performance, weight, whereby high volumetric compressor efficiency is attained at low speeds as well as high speeds without adverse torque peak loads on the driving means; and including piston actuating means of such simple form and of such low consumption of power by friction and slight generation of heat that lubrication by oil mist circulating therethrough with suitable refrigerant through the refrigeration circuit provides sufficient lubrication and the usual oil sump is eliminated, thereby providing a compressor unit of cylindrical form with the axis of the cylinder coinciding with the axes of all components of the piston actuating means.

The present invention relates to air conditioning system compressors and drive means therefor and, more particularly, to mobilized compressor and drive units powered from the motor of the vehicle upon which the same may be installed.

Refrigeration systems of the automotive or mobile type differ from stationary systems in several ways and a compressor for mobile types must be designed rather specifically, as for example:

(1) Limited available space demands compact size not only for the compressor but for the other system components as well.

(2) Generally, the compressor has a high pumping capacity in proportion to the other system components than a compressor in stationary systems would have because of the need for rapid initial cooling or "pull down" of the system. Since the need for rapid initial "pull down" more than often comes at a time when compressor rotational speed will be low, positive displacement and high volumetric efficiency must be present at low rotational speed without imposing adverse torque peak loads on the driving mechanism.

(3) In other conditions the same compressor must be capable of sustaining high rotational speeds without damage and without imposing undue loads on the other system components or drive mechanism.

(4) Because of the requirement of high efficiency to size of the heat exchangers in automotive systems, entrained system oil must be kept at a minimum. Thus another requirement of the compressor involves a means for prevention of excess oil discharge into the refrigeration system.

Because of the above enumerated requirements for refrigeration systems of the automotive or mobile type relative to stationary systems, it is an object of this invention to provide, in a piston type compressor, piston actuating means of simple construction with negligible consumption of power by friction, whereby oil mist circulating with refrigerant through the system refrigeration circuit is sufficient to efficiently lubricate the piston actuating means, and the usual sump area of prior system devices is eliminated.

Another object is to provide a compressor of a true cylindrical shape wherein the axis of the cylinder coincides with the axes of the driving means of the compressor, such as the axes of the motor driven pulley, the driven shaft, the piston actuating drive means, bearing for same, and the axial arrangement of pistons and cylinders of the compressor.

Still another object is to provide a novel casing for a compressor unit having an outer shell and an inner shell for a piston type compressor formed with inner cylindrical surfaces having a common axis, whereby the inner cylindrical surface of the inner shell confines and maintains the working parts of the unit in their respective working relationships while maintaining all such parts in a longitudinally axial direction parallel with respect to the said common axis.

Another object is to provide in combination with an accurately true outer cylindrical surface of the casing for the compressor unit, simple bracket means having versatility of adaptation to efficient and satisfactory installation in various engines with minimum adjustment requirements while longitudinally or rotatively maintaining a constant optimum axial alignment of all parts of the compressor unit without conflict with other components of an engine confined under the hood of an automotive vehicle.

Another object is to provide novel compressor units for multiple cylinder type automotive and other mobilized air conditioning systems, whereby simple manufacturing and assembly techniques of the units provide for low costs, reduction in weight and for smooth performance to sharply reduce torque peak loads encountered during operation.

Another object is to provide roller bearing means throughout the compressor units with a novel drive means from a power take-off vehicle motor pulley drive assembly, whereby all high load plain bearings are subjected only to oscillating movements and will retain oil lubricating film for relatively long periods to permit use of a small housing and use of an emulsion of refrigerant and oil to create the mist necessary for satisfactory lubrication by agitation from the oscillatory action of the novel drive means.

Thus with the present compressor and novel oscillatory connections, the unit housing provides for a small housing with no appreciable sump area as required in the prior art and the rotary to oscillating motion of the novel drive connections to the compressor pistons comprised in a housing of such small volume provides sufficient agitation of the oil supply at all times to create the mist necessary for efficient roller bearing lubrication.

With the above and other objects in view which will become apparent as the invention is fully understood, the same resides in the novelty of construction, combination and arrangement of parts hereinafter described in detail and distinctly claimed in the appended claims.

The description should be read in conjunction with the accompanying drawings, wherein:

FIG. 1 is a cross section view taken longitudinally along a line axially through the assembled unit;

FIG. 2 is a cross section view taken transversely of the assembled unit along section line 2—2 of FIG. 1;

FIG. 3 is a detail view in plan of one of the low torque providing ring roller bearing means used between rotating parts;

FIG. 3A is an edge view in elevation of the bearing in FIG. 3, including a shim bearing ring;

Figure 4:
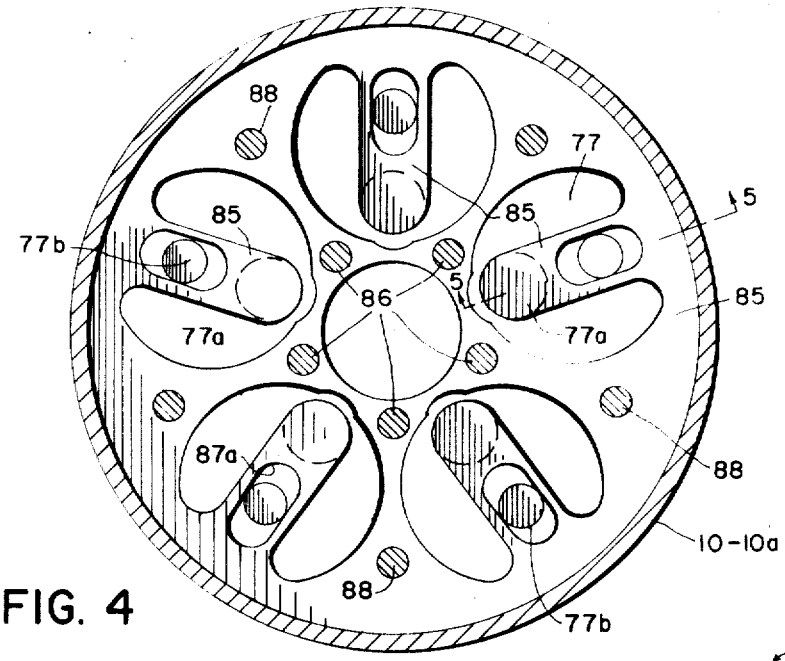
FIG. 4 is a plan view of the suction reed valve means applied to the valve plate mounted between the cylinder block and head portion therefor.

Referring to the drawings, and first with more specific reference to FIG. 1, there is shown, in cross section taken axially through the combined unit, a housing 10 with a main smooth bore bounded by a series of internal threads 11 around an annular surface at one end and by an inturned flange 12 at the opposite end. The internal threads 11 mate with the external threads 13 formed in an annular retaining ring 14, which, when threaded into the housing end, may compress an O-ring 15 tightly against the outturned annular shoulder 16 of an end bell 17.

The end bell 17 is formed with a central bore 18 through which extends a drive shaft 20 formed with relatively different sections 21, 22 and 23 to provide for maximum co-operative efficiency in combination with main bearing means, such as roller bearings 24 and 25 and fluid seal 26 and packing means 27. The fluid seal 26 and packing means 27 are secured in place around the shaft section 21 by a retainer ring 28.

The drive shaft 20 has an internal end 30 within the housing 10 secured by key means 31 to a wedge-shaped rotor or swash plate 29 and an external end without the housing 10 formed with suitable means 32, such as threads, splines or the like, for driving connection with a suitable clutch and pulley drive arrangement as is generally well-known in the art of motor vehicle mounted compressor and drive units.

The wedge-shaped rotor or swash plate 29 is formed with an annular bearing surface 34 and a socket 35 defined around a central collar 36. This collar is fixed in a suitable manner, such as by the key means 31 to the internal end 30 of the drive shaft 20, whereby the rotor or swash plate 29 is rotatable with the drive shaft 20. The bearing surface 34 is located opposite to a closely adjacent bearing surface 37 formed around the inner face of the end bell 17 and around the hub-like center portion 38, which defines the main bearing area in the bell.

The wedge-shaped rotor or swash plate 29 on the opposite face thereof is formed with a relatively angular bearing surface 40 with respect to bearing surface 34. The angular surface of the plate 29 is positioned in close proximity to a cooperating bearing surface 41 formed around the face of an oscillating means, such as a wobble or follower plate 42 in the provision of a space for a roller ring bearing 43 with an annular shim 46 fitted around a sealing ring 44 seated in an annular groove 45 in this face of the wobble plate. Thus, when drive is imparted to rotate the wedge-shaped plate 29, a frictionless driving action to said wobble or follower plate 42 is provided.

The wobble or follower plate 42 in one form of the invention may include trunnion means including a trunnion pin 47 with a transverse screw opening 48, a trunnion block 49, and guide way 50 positioned to receive the block therein and thereby prevent rotation of the wobble plate. The trunnion pin 47 extends from a radial opening 51 in the perimeter of the follower or wobble plate 42 and is retained in position in the wobble plate by suitable means, such as set screw 52.

Formed around the opposite face of the wobble plate 42 are spherical bearing sockets 53. In this instance there are shown, for example, five such sockets, which each receive the round bearing head 54 of a piston rod 55 connected to each of a plurality of piston means 56 of a compressor unit 60. Each piston rod head 54 is suitably secured to the plate 42 by means such as an annular retainer ring 57 with outwardly flared openings 58 or by staking over the walls of the sockets 53, if preferred.

The compressor unit 60 includes a cylinder block 61 formed with the cylinders 59 for each of the piston means 56 and a central bore 62 extending axially therethrough. The bore 62 is defined by a skirt 63 with a reduced bore projected toward the wobbler or follower plant 42 and is formed to receive the flanged end 65 of a sleeve 64 formed with a reduced end and internal threads 66 of an adjustable bearing assembly. This assembly includes a post or pin 67 having a reduced threaded end 68 with an end slot 69 for tool insertion to turn the pin. The threads 66 and 68 are arranged to mate for threaded adjustment of the pin 67 in the sleeve 64. This pin is suitably secured as by swaging or the like into a spherical bearing head 70 seated in a mating spherical bearing socket 71 formed in the center face portion of the plate 42.

The compressure unit 60 and the drive mechanism therefor may be maintained in their respective axially aligned spaced operating positions in housing 10 with the aid of spacing ring means 72 and 73; the retainer ring 14 and O-ring 15; and by a cylinder head 74 with an outwardly turned flange 75 at the opposite end with the housing inturned flange 12. The flange 12 coactively laps over flange 75 and thereby retains the cylinder head 74 over this end of the housing in spaced but close proximity to the end 76 of the cylinder block 61 in the provision of a space for a valve plate 77 with inlet and outlet ports 77a and 77b, respectively, for suitable reed valve means.

The cylinder head 74 includes a suction chamber 80 and a discharge chamber 81 and is formed with a central opening defined by threaded bore 78 for an inlet coupler 79 from a source of refrigerant supply, such as an emulsion of refrigerant and lubricant. This coupler leads into a suction chamber 80 seated on the valve plate 77 over the valve plate 77 over the input valve area thereof. A second opening defined by a threaded bore 82 is provided for a discharge chamber 81 to a refrigeration unit or the like. This is hereinafter explained more fully in reference to the operation cycle of the compressor.

Inlet and discharge ports 77a and 77b in the valve plate 77 are provided for each respective cylinder 59, which are controlled, respectively, by suitable reed valves, such as inlet needs 85 secured by suitable means, such as bolts 86, threaded into the cylinder block and the outlet reeds 87 similarly secured by bolts 88. These bolts also secure outlet reed valve stop ring 89, see FIGS. 1 and 5.

The compressor unit 60 and drive means, when operated, will receive an emulsion of refrigerant gas and lubricating oil into the suction cavity or chamber 80 and cause a vapor-like supply of lubricant to the several roller bearing surfaces in the unit. For example, lubricant may flow through orifices 96 in the cylinder block 61 to the bearings and thence to the lower part of the cylindrical housing 10, see FIG. 1.

Because of the vaporous nature of the lubricant, no sump area is needed as there is no excess oil from this emulsion feed arrangement, as will be explained by the following description of a refrigerant cycle.

REFRIGERANT CYCLE

In operation, the emulsion of refrigerant gas and lubricating oil is introduced through the suction fitting 79 which is centrally positioned in the cylinder head 74. As the emulseion enters the suction oil separator cavity 80 the gas and oil are separated, the gas flow is diverted approximately 180°, while the oil is returned to the compressor rotor case through the oil return holes 96.

The refrigerant gas proceeds through the cylinder head intake 79, past the suction intake reed 85 and into the respective cylinders 59 as the piston means 56 complete their respective down intake strokes. As the piston means 56 make the upward compression stroke the refrigerant gas is compressed and forced out through the discharge port and outlet reeds 87. This port connects through a central relief opening 87a, see FIG. 4, in the suction reed 85 past the discharge reed 87, into the cylinder head 74, discharge channel, and out the discharge fitting 83 into a conventional mechanical refrigeration circuit, not shown.

DESCRIPTION OF MECHANICAL MOTION

Operation of the unit is started by rotation of the input or drive shaft 20, which forces rotation of the wedge-shaped rotor or swash plate 29, said shaft-rotor assembly being retained laterally by the roller type shaft main bearing assembly 24 and 25. Directly adjacent to the angular face 40 of the rotor 29 is the oscillating follower or piston rod beaing wobbler plate 42, the opposing center of which is provided with a partially spherical socket 71 of suitable conformable bearing material. The oscilaltor follower plate 42 is held to proper running clearance with the rotor 29 by means of an adjustable ball type bearing 67, the center of which lies on a continuation of the center line of the input shaft 20.

Figure 7:
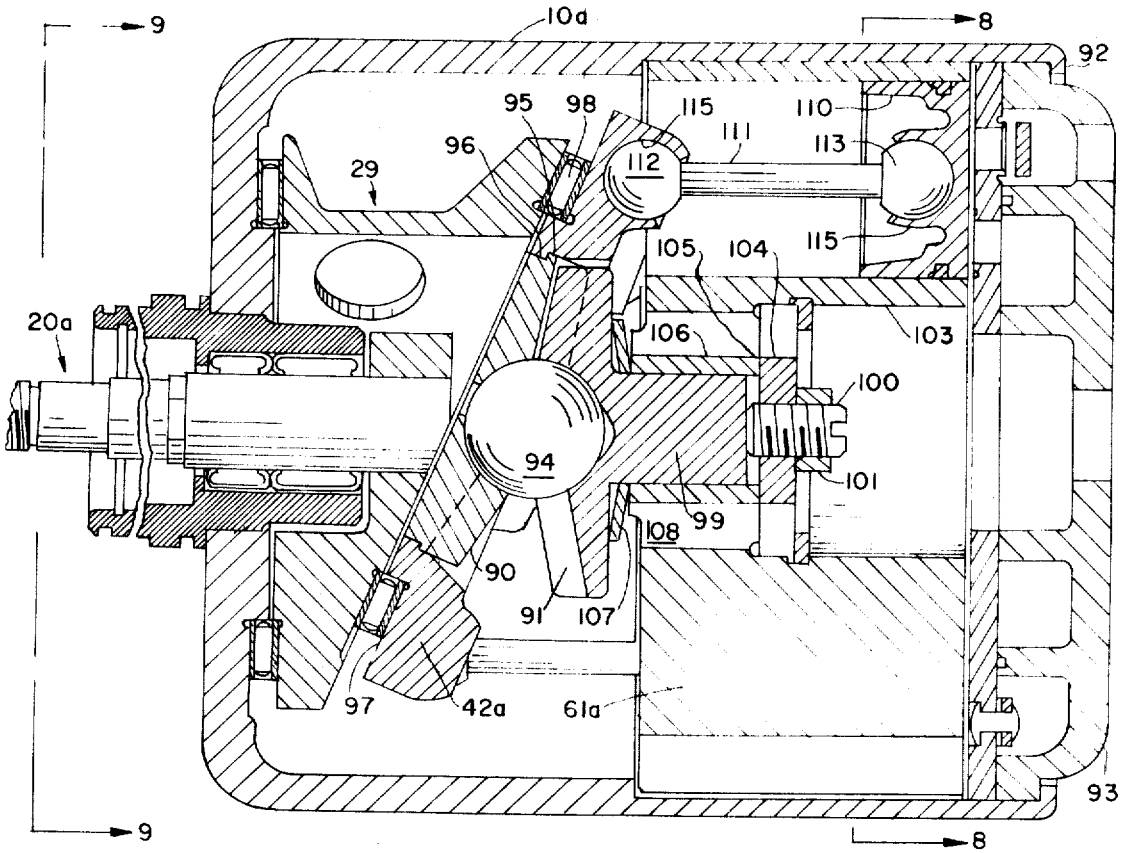
FIG. 7 is a longitudinal section view of another embodiment of the invention.
Figure 9:
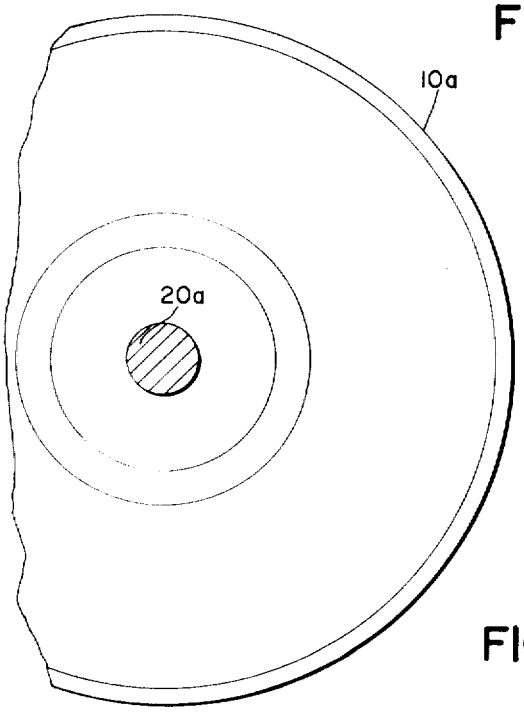
FIG. 9 is an end elevation view of the drive shaft and bell head end of the unit.
Figure 8:
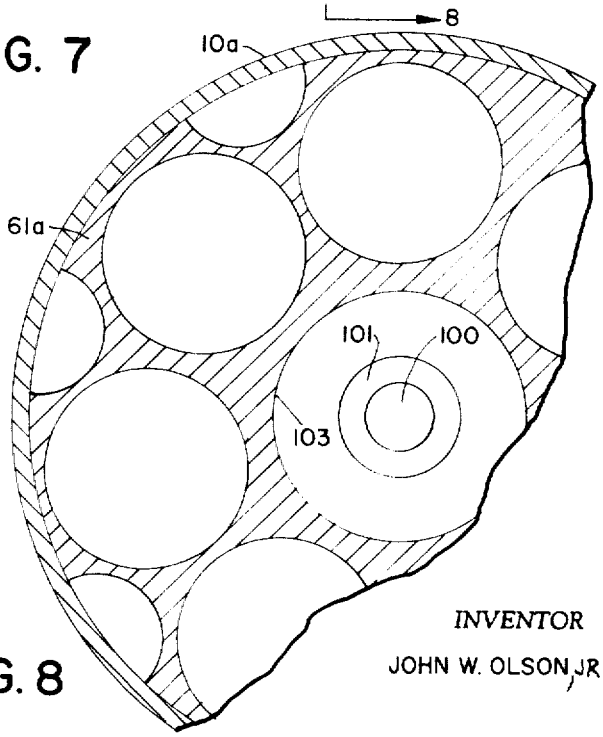
FIG. 8 is a transverse section taken along line 8—8 of FIG. 7.

The follower plate 42 is free to oscillate upon the post bearing but is retained from rotation by a trunnion and guide 49–50, see FIG. 1, or by a pair of bevel gears 90 and 91 of one to one ratio, see FIG. 7 of the second embodiment.

On a circle concentric with the spherical center bearing 77 the follower plate 42 is provided with the several equally spaced partially spherical socket bearings into which are assembled ball end actuating rods, each of which is fitted on the extending end with a piston 56. Each piston 56 is a close fit into its corresponding cylinder 59 and is equipped with one or more sealing rings 96a for the purpose of efficient gas compression within its respective cylinder 59.

The set of roller thrust bearings 34 and 43 on each side of the rotor 29 run in position directly in line with the piston-rod thrust load in compression, thus avoiding the cantilever bearing loading evident in some prior art.

Positive piston retraction is effected by the rocker action of the wobbler or follower plate 42 upon the post bearing 67 as the rotor 29 turns. Because of the in-line bearing loading and because of the accuracy obtainable in finishing the respective rotor faces, piston stroke can be closely controlled and, thus, the piston closing clearance relative to the valve plate 77 can be closely held in production to insure full purging of each cylinder 59 and high volumetric efficiency.

Now with reference to FIG. 7, there is shown another embodiment of the invention, wherein the trunnion guide assembly is replaced with bevel gear means 90 and 91. This second embodiment comprises a one-piece cylinder to provide the housing 10a preferably formed, for example, of impact extruded steel or aluminum which is spun over to provide a flange 92 at the end supporting a cylinder head 93 during assembly of the compressor.

With this type of simplified construction very accurate concentricity is provided between the drive shaft 20a and a reaction ball 94 which, in this embodiment, serves as a bearing area between the pair of facing bevel gears 90 and 91 mounted on the wobble plate 42a and in the cylinder block 61a, respectively.

In this embodiment the gear 90 is an oscillating bevel gear formed with a shoulder 95 which seats on annular mating shoulder 96 formed from a wall defining the inner bore of a wobbler or follower plate 42a. The outer peripheral face of the plate 42a is formed with an annular surface 97 to receive an annular roller thrust bearing 98.

The gear 91 of FIG. 7 includes an axial extension 99 mounted in the compressor block 61a angularly with respect to oscillating gear 91 and comprises bevel gear teeth in mesh with oscillating teeth of bevel gear 90 during compressor operation, to thereby prevent rotation of the wobbler or follower plate 42a. The plate 42a, as it oscillates, is novelly mounted to provide direct in-line thrust operation of the compressor piston means avoiding any lateral bearing loads. The axial extension 99 of the bevel gear 91 may be adjusted axially by suitable means, such as a set screw 100 and annular spider means 101 mounted in an annular groove formed around the central bore 103 of the compressor cylinder block 61a. This spider means cooperates with a spacer or washer 104 engaged with the rim 105 of a sleeve 106 with a reduced bore preferably formed from the cylinder block 61a concentric to the longitudinal axis of bore 103. The gear 91 is provided with clearance damper means, such as a Belleville washer 107 axially placed between the block 61a and the base of the bevel gear 91 adjacent the entrant end of the reduced bore of the sleeve 106.

The sleeve 106 is formed in the block concentrically with respect to its main bore 103 and the block is formed with longitudinally arranged elongated ports or ducts 108 to permit flow of oil vapor therethrough during compressor operation.

Figure 5:
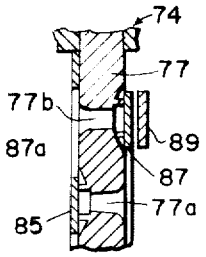
FIG. 5 is a section view taken on section line 5—5 of FIG. 4.
Figure 6:
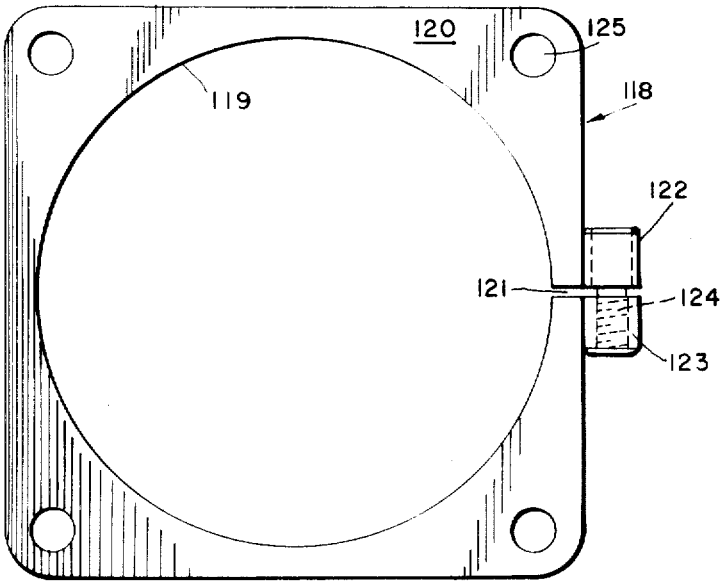
FIG. 6 is a form of housing mounting bracket preferable for mounting the present invention in axial alignment and parallel relation to the drive and driven parts of the compressor and so shaped and proportioned as to conform to the outer true cylindrical form of the compressor casing.

The compressor of this embodiment is generally similar to the compressor of the embodiment of FIGS. 1 through 5 and may be mounted with the same form of bracket as shown in FIG. 6. However, the cylinder block may be scolloped around its outer circumference to reduce some weight and the cylinders 109 in this form are increased from five to seven cylinders with respective piston means 110 and connecting rods 111. The pistons, connecting rods and their respective spherical end connections 112 and 113 are coupled between spherical sockets 114 of pistons 110 and the spherical sockets 115 of the wobbler plate 42a. These spherical sockets 114 and 115 of the respective oscillating and reciprocating parts of the compressor are staked or folded over the spherical ends of the connecting or piston rods 111. Thus, with this embodiment, the need for an annular ring retainer such as 57 of the first embodiment may be eliminated, if desired.

In the second embodiment the valve plate and reed valve means are generally identical to those of FIGS. 1, 4 and 5, except that the number of reed valves are increased to suit the increase in the number of compressor pistons and cylinders. Accordingly, it is not believed necessary to go into detail regarding this feature, which otherwise operates as described in connection with the first embodiment.

Each of the embodiments illustrated and described herein are so shaped and formed as to be truly symmetrical, that is, the cylindrical exterior of the housings 10 and 10a are true cylinders. Every internally mounted component within the truely cylindrical housings are concentric and positioned on longitudinal axes in alignment or in spaced parallel axial arrangement, whereby no lateral loading on the parts results and no misalignment problems with respect to the drive pulley on the engine shaft results since the compressor pistons are always operated in directions parallel with the driven shaft.

With this form of compressor and a true cylindrical housing, it is found that mounting brackets such as 118, see FIG. 6, are particularly efficient. The brackets are formed with an inner smooth bore ring area 119 defined by an outer plate-like rectangular area 120, which may be parted on one side to provide a slot 121 with coupling lugs 122 and 123 to receive a suitable fastener, such as a coupling screw or bolt 124. When the coupling bolt 124 is tightened the ring area around the compressor housing clamps the outer cylindrical surface 10 or 10a of the compressor and the outer rectangular area of the brackets are formed with mounting apertures 125 in each corner obviating the need for the usual mounting plates used with relatively expensive brackets, such as heretofore employed.

These brackets 118 are not only inexpensive and easy to adapt and mount to various engines, but provide two important adjustments for more perfect adaptation after installation. For example, one, the cylindrical shaped compressor may be adjusted longitudinally in the brackets through the ring area 119 thereof without changing the direction of the compressor axis. Two, the cylindrical compressor may be rotated in the ring areas 119 of the clamping brackets 118 without changing either the direction of the axis or the pulley-belt drive alignment with the axially aligned components of the compressor. Thus, with this form of bracket, it is possible, during installation, to change the refrigerant connection locations for an inch or more, if necessary, to avoid any conflict with other components under the engine hood.

Thus, there is provided a novel compressor unit for mobilized air conditioning systems, which is simple to assemble, mount under the hood of an automobile or the like and which is lighter in weight and smaller in size, because of the reduction in the volume of the housing required for the unit.

Without further description, it is believed that the advantages of the present invention over the prior art is apparent and while only two embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:

1. A motor vehicle engine mounted refrigerant compressor and drive means therefor, comprising:

a housing formed with an inturned flange at one end and an internally threaded rim at the other end;

said housing serving to mount and position both said compressor and said drive means therefor in axially aligned operating relation;

said compressor comprising a cylinder block mounted in said housing with a central bore having one end defined by a skirt portion to facilitate axial connection to said compressor drive means;

said block having a plurality of axially directed cylinder means formed therein in spaced annular relation;

a cylinder head formed with a suction chamber common to each cylinder and an exhaust chamber likewise common to each cylinder;

said head having an outturned flange in mating position under said inturned flange of said housing, whereby said head is mounted in spaced relation over the cylinders in said block;

said rotor member having bearing surfaces on each side thereof;

one of said surfaces being closely adjacent an opposed bearing surface formed around the interior of said end bell in the provision of an annular space;

bearing means in said annular space engaging said respective bearing surfaces;

said rotor bearing surface on the opposite side of said rotor being angularly disposed with respect to said first-mentioned surface thereof;

wobble means with a bearing surface mounted closely adjacent to said angular bearing surface of said rotor in the provision of a relative angular bearing space therebetween;

extended means carried by said wobble means to provide non-rotatable motion of said wobble means;

bearing means in said space permitting frictionless drive from said rotor to said wobble means;

radially spaced axially extending connecting rods universally connected to the said wobble means on the fact opposite to said rotor facing portion;

said connecting rods extending into each cylinder means;

a piston connected to each connecting rod for axial reciprocation within said cylinders;

bearing means mounted centrally in the said last-named face of the wobble means for connecting said compressor to said wobble means of said drive means in said housing;

said bearing means being adjustably mounted on a post longitudinally adjustable in a mating sleeve;

said sleeve having a flange on one end and an internally threaded reduced end opposite to said flange end;

said wobble bearing post including a shank with one end secured with a portion of said central bearing means and an opposite reduced end formed with screw threads extending from the reduced internally threaded end of said sleeve;

a slotted end formed in said reduced threaded end exposed for adjustment access in said central bore of the cylinder block;

a valve plate with inlet openings in registry with said suction chamber and with exhaust openings in registry with said exhaust chamber;

said valve plate being secured between said cylinder head and said cylinder block;

said plate having reed valve means for control of said inlet openings and for control of said exhaust openings in response to the operation of said compressor;

an inlet coupling leading into said suction chamber and an exhaust coupling leading from said exhaust chamber;

said drive means including an end bell including a rotary end seal, packing and bearing assembly;

a drive shaft having an exterior end and an interior end medially journalled in the said housing;

means on the said exterior end of the drive shaft for mounting a power driven pulley and clutch assembly;

a rotor member fixed to the interior end of said drive shaft;

lock means for holding said post in adjusted position;

said sleeve being centrally mounted in said central bore of said cylinder block with said flange thereof seated against the rim of said skirt portion of the said central bore; and power means for driving said compressor drive means and said compressor through said pulley and clutch assembly.

2. A motor vehicle engine mounted refrigerant compressor and drive means therefor as described in claim 1, wherein said extended means from the said wobbler plate engages with guide means carried by the housing bore.

3. A motor vehicle engine mounted refrigerant compressor and drive means therefor as described in claim 1, wherein said extended means from the wobbler plate are bevel gear teeth engageable with bevel gear teeth fixed to a stationary adjacent portion of the compressor means.

[4. In a housing a compressor and drive means with a drive shaft therefore in said housing, said compressor consisting of:

a cylinder block formed with a plurality of cylinders arranged in a circle;

a cylinder head formed with a suction chamber and a surrounding discharge chamber;

valve means for supply fluid to said compressor through said suction chamber and discharge through said discharge chamber to an air-conditioning system;

said cylinder block having a central bore through said cylinder block;

a bearing pin mounted in said central bore of the block;

a spherical head on the said pin mounted in a component of said drive means;

said component being a wobble plate with a mating spherical socket oscillatable on the said spherical head;

said wobble plate being activated oscillate by swash plate means carried by said drive shaft of the drive means;

means in the housing to prevent rotation of said wobble plate;

said compressor including connecting rods and respective piston means for each rod mounted to be reciprocated by said wobble plate in each one of said respective cylinders aligned with one of said connecting rods;

each connecting rod having an end spherical bearing mounted to mate with socket means arranged in a circle in a face of said wobble plate adjacent said cylinder block;

a source of fluid under pressure, fluid conduit inlet means connecting said source of fluid with said valve means, and a fluid conduit outlet from said discharge chamber.]

[5. In a refrigerant compressor unit as described in claim 4, wherein said plate has thrust roller bearing means on each side thereof in the provision of a direct in-line operating position with respect to piston rod thrust load of said connecting rods and piston means thereby avoiding cantilever bearing loading.]

*6. A compressor comprising:*

*drive means including a drive shaft;*

*a cylinder block being formed with a plurality of cylinders arranged substantially in a circle;*

*a cylinder head formed with an intake and a discharge chamber;*

*valve means for supplying fluid to said compressor through said intake chamber and discharging said fluid through said discharge chamber;*

*said cylinder block having a central bore through said cylinder block;*

*a bearing pin mounted in said central bore of the block;*

*spherical bearing means disposed on one end of said bearing pin and mounted in a component of said drive means;*

*said component being a wobble plate with a mating spherical socket oscillatable on the said spherical bearing means;*

*said wobble plate being activated to oscillate by a rotating swash plate means carried by the said drive shaft of the drive means;*

*a pair of facing bevel gears, one bevel gear being carried by said wobble plate and the second bevel gear being at said one end of said bearing pin extending from the central bore in the cylinder block to prevent rotation of said wobble plate;*

*said compressor including connecting rods and respective piston means for each rod mounted to be reciprocated by said wobble plate in each one of said respective cylinders.*

*7. A compressor according to claim 6 wherein roller bearing means are provided on each side of said swash plate.*

*8. A compressor according to claim 6 wherein means are provided for adjusting said bearing pin longitudinally in the central bore of the cylinder block.*

*9. A compressor as described in claim 8, said means for adjusting said bearing pin includes spring means mounted in co-active relation with a set-screw means and whereby teeth on said facing bevel gears engage to inhibit rotation of said wobble plate as it is driven by said rotating swash plate.*

References Cited

The following references, cited by the Examiner, are of record in the patented file of this patent or the original patent.

UNITED STATES PATENTS

| | | | |
|---|---|---|---|
| 2,798,663 | 7/1957 | Chayne et al. | 230—186 |
| 2,868,443 | 1/1959 | Dolza | 230—186 |
| 2,911,170 | 11/1959 | Galin et al. | 230—186 |
| 3,092,307 | 6/1963 | Heidorn | 230—186 X |
| 3,220,211 | 11/1965 | Nordquest | 230—186 X |
| 3,327,642 | 6/1967 | Budzich | 103—173 |
| 3,380,392 | 4/1968 | Boers | 103—173 X |
| 3,455,585 | 7/1969 | Raymond | 103—173 X |
| 2,825,499 | 3/1958 | Gibson et al. | 230—186 X |
| 2,380,574 | 7/1945 | Beeh et al. | 417—269 |
| 3,151,527 | 10/1964 | Hamlin | 74—60 |
| 2,737,055 | 3/1956 | Daubin | 74—60 |
| 1,127,065 | 2/1915 | Milne | 74—60 |
| 1,781,130 | 11/1930 | Shaff | 74—60 |
| 1,781,132 | 11/1930 | Shaff | 74—60 |

FOREIGN PATENTS

| | | | |
|---|---|---|---|
| 304,555 | 1/1929 | Great Britain | 74—60 |
| 134,261 | 4/1950 | Netherlands | 103—173 |

WILLIAM L. FREEH, Primary Examiner